Dec. 23, 1930.  J. L. WOODBRIDGE  1,786,280
MEANS FOR CONTROLLING THE CHARGE OF A STORAGE BATTERY
Filed Dec. 31, 1927
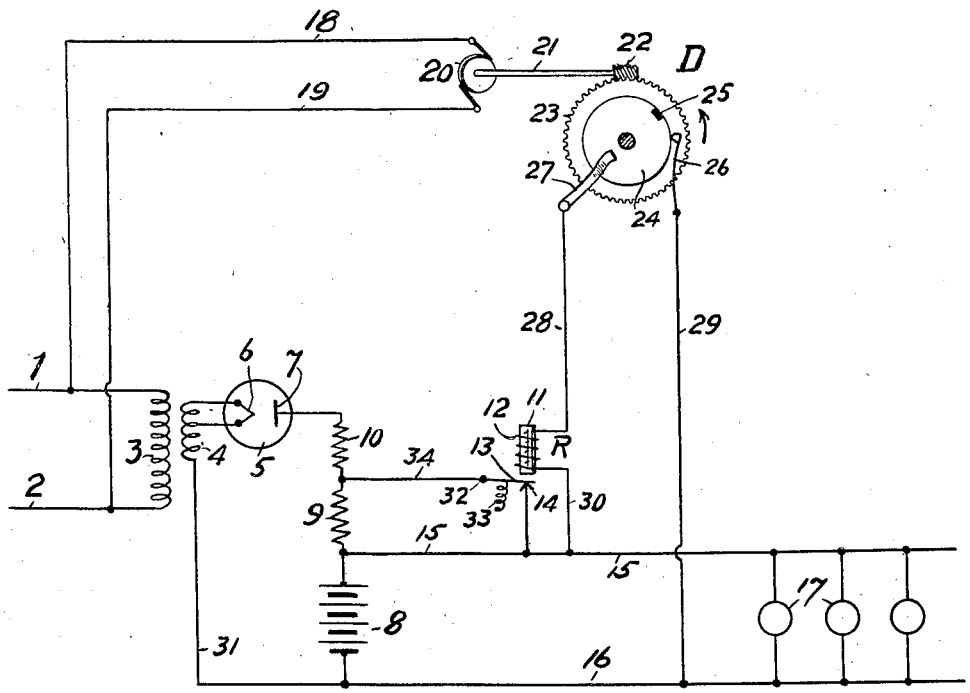
WITNESS:
INVENTOR
Joseph Lester Woodbridge
BY
Augustus B. Stoughton
ATTORNEY.

Patented Dec. 23, 1930

1,786,280

UNITED STATES PATENT OFFICE

JOSEPH LESTER WOODBRIDGE, OF PHILADELPHIA, PENNSYLVANIA

MEANS FOR CONTROLLING THE CHARGE OF A STORAGE BATTERY

Application filed December 31, 1927. Serial No. 243,794.

My invention relates to apparatus for charging a storage battery and applies more particularly to a battery which is subjected to an intermittent or variable load which cannot be accurately predetermined.

The object of my invention is to provide automatic and comparatively simple and inexpensive means for adapting the amount of charge furnished to the storage battery to the varying load conditions so that the battery shall be kept fully charged without endangering serious overcharge and without requiring frequent manual adjustment of the charging conditions.

My invention will be more fully understood by reference to the following description of one embodiment thereof, taken in connection with the accompanying drawing which illustrates diagrammatically and in a single figure an arrangement of apparatus embodying features of my invention.

In the drawing, 8 represents a storage battery connected to a load circuit 15, 16, to which are connected translating devices 17 constituting a variable load. The current for charging the battery is supplied from the alternating current circuit 1, 2 through a suitable transformer, whose primary winding is represented by 3 and whose secondary winding is represented by 4. The output from the secondary winding is rectified by means of the thermionic valve 5, whose filament is represented by 6 and whose plate is represented by 7. The filament 6 is excited by connection to a few turns of the secondary winding 4.

A pulsating current is thus delivered to the battery by way of the controlling resistors 10 and 9, returning to the secondary winding 4 via conductor 31.

A relay for controlling the charging current is shown at R. It is provided with a magnetic core 11, on which is wound an exciting coil 12 and it has an armature 13 pivoted at 32 and normally held in contact with the contact point 14 by means of the retractive spring 33. When the armature 13 is in contact with the point 14, the resistor 9 is short circuited via conductor 34, armature 13, contact point 14 and conductor 15. In this position of the armature 13, a maximum charging rate to the battery is provided. When the coil 12 is suitably excited, the armature 13 will be attracted and the contact with point 14 will be broken, thereby inserting the resistor 9 in the charging circuit and reducing the charging rate to a minimum value.

The coil 12 is connected across the battery terminals by conductor 30 on one side and on the other side via conductor 28, contact strip 27, conducting disk 24, contact 26 and conductors 29 and 16. The relay R is so designed and adjusted that when the battery voltage reaches a predetermined value corresponding to a point on the steep portion of the charge voltage curve near the end of charge where appreciable gassing begins, the armature 13 will be attracted and the charging rate will thereby be reduced. In order to reset the relay R for the higher charging rate, the device shown at D is provided, consisting of a worm and gear 22, 23, the gear carrying a conducting disk 24 against which the contact strip 27 and the contact point 26 continuously bear. In the periphery of the disk 24 is a non-conducting segment 25, which in passing under the contact point 26 temporarily interrupts the flow of current in the circuit.

The worm 22 is driven by means of shaft 21 by the motor 20 connected by conductors 18 and 19 to the circuit 1, 2.

The operation of the apparatus described above is as follows:

Starting with the battery partly discharged and with the relay armature 13 in contact with the point 14, the battery will be charging at the maximum rate. With the contact point 26 bearing against the conducting portion of the disk 24, the coil 12 of the relay R will be excited and when the charging of the battery has reached a point where the full charge condition is approaching and the gassing begins, the battery voltage will rise rapidly to a value sufficient to cause the armature 13 to be attracted, breaking the contact at 14 and reducing the charging rate to the minimum value.

The disk 24 will be driven in a counter clockwise direction as indicated by the arrow until the insulating sector 25 comes in contact with the point 26 when the circuit of the coil 12 will be interrupted and the armature 13 will be brought into contact with point 14, thus short circuiting the resistor 9 and reestablishing the maximum charging rate. Further travel of the disk 24 will in a brief interval of time bring the conducting portion of this disk in contact with point 26, and the excitation of coil 12 will be restored. If the battery has been subjected to an appreciable amount of discharge due for example to the excess of the load 17 above the value of the current supplied to the battery, the battery voltage will not be sufficient to open the contact between armature 13 and point 14 until the charge at the higher rate has progressed for a sufficient length of time to restore the current which has been taken out of the battery and bring the battery again to an approximately full state of charge when its voltage will again rise sharply and the contact between armature 13 and point 14 will be broken, reducing the charging rate to the minimum value.

It will be seen from the above that the apparatus provides for a maximum and a minimum rate of current delivered to the battery terminals and that automatic means responsive to the battery voltage is provided for changing from the high rate to the low rate and other means are provided for readjusting the first mentioned means for the higher rate of current at predetermined time intervals.

While I have shown the device D as a revolving disk continuously driven by a motor 20 connected to the circuit 1, 2 it will be obvious that any other well known equivalent device may be substituted for momentarily interrupting the circuit of the coil 12 at predetermined intervals, as for example a contact making clock device.

Having described my invention, what I desire to secure by Letters Patent is:

1. In combination, a storage battery and its load circuit, a charging source for the battery, means for transmitting current from the source to the battery selectively at either of two different rates, means responsive to the battery voltage and adapted to reduce the rate from the higher to the lower value, and other means for restoring the rate to the higher value at regular time intervals.

2. In combination, a storage battery and its load circuit, a charging source for the battery, means for transmitting current from the source to the battery selectively at either of two different rates, means including a coil connected across the battery terminals for reducing the rate from the higher to the lower value at a predetermined battery voltage and means for opening and closing the circuit of the coil at definite time intervals to reestablish the higher rate.

3. In combination, a storage battery and its load circuit, a charging source for the battery, means for transmitting current from the source to the battery selectively at either of two different rates, means responsive to the battery voltage and adapted to reduce the rate from the higher to the lower value and other means independent of the battery condition for periodically re-establishing the higher rate.

4. In combination a storage battery, a charging source therefor, means for transmitting from the source to the battery a charging current, means responsive to the voltage of the battery for reducing the charging current, and means for restoring the charging current to its original value at definite time intervals.

5. In combination a storage battery, a charging source therefor, a circuit for transmitting from the source to the battery a charging current, means responsive to the voltage of the battery for changing the charging circuit to reduce the charging current, and means for restoring the charging circuit to its original condition at definite time intervals.

JOSEPH LESTER WOODBRIDGE.